US009197639B2

(12) United States Patent
Kim et al.

(10) Patent No.: US 9,197,639 B2
(45) Date of Patent: Nov. 24, 2015

(54) METHOD FOR SHARING DATA OF DEVICE IN M2M COMMUNICATION AND SYSTEM THEREFOR

(75) Inventors: Kyung Su Kim, Gyeonggi-do (KR); Jae Ho Lee, Seoul (KR); Yong Jin Kim, Seoul (KR)

(73) Assignee: MODACOM CO., LTD., Seoul (KR)

( * ) Notice: Subject to any disclaimer, the term of this patent is extended or adjusted under 35 U.S.C. 154(b) by 0 days.

(21) Appl. No.: 14/358,877

(22) PCT Filed: Dec. 16, 2011

(86) PCT No.: PCT/KR2011/009705
§ 371 (c)(1),
(2), (4) Date: May 16, 2014

(87) PCT Pub. No.: WO2013/085088
PCT Pub. Date: Jun. 13, 2013

(65) Prior Publication Data
US 2014/0317707 A1      Oct. 23, 2014

(30) Foreign Application Priority Data

Dec. 7, 2011   (KR) .................. 10-2011-0130469

(51) Int. Cl.
*G06F 15/16*   (2006.01)
*H04L 29/06*   (2006.01)
*H04W 12/04*   (2009.01)
*H04L 29/08*   (2006.01)
*H04W 12/08*   (2009.01)
*H04W 4/00*   (2009.01)

(52) U.S. Cl.
CPC .......... *H04L 63/0869* (2013.01); *H04L 63/126* (2013.01); *H04L 67/104* (2013.01); *H04W 12/04* (2013.01); *H04W 12/08* (2013.01); *H04L 63/068* (2013.01); *H04L 63/102* (2013.01); *H04W 4/005* (2013.01)

(58) Field of Classification Search
CPC ..... H04W 4/005; H04W 12/04; H04W 12/08; H04L 63/0869; H04L 67/104; H04L 63/068; H04L 63/102
USPC .............................................. 726/2, 6, 27, 30
See application file for complete search history.

(56) References Cited

U.S. PATENT DOCUMENTS

2010/0057485 A1   3/2010   Luft
2011/0016321 A1   1/2011   Sundaram et al.
2011/0264914 A1*  10/2011  Bae et al. ...................... 713/170

OTHER PUBLICATIONS

3GPP TSG SA WG2 Meeting #85, TD S2-112291, Mapping aspects for ETSI M2M architecture, May 11, 2011.
3GPP TS 22.368 V10.2.0, Service requirements for Machine-Type Communications (MTC); Stage 1 (Release 10), Sep. 30, 2010.

* cited by examiner

*Primary Examiner* — Baotran N To
(74) *Attorney, Agent, or Firm* — Rabin & Berdo, P.C.

(57) ABSTRACT

The present invention relates to a method for sharing data of a device in M2M communication and a system therefor. The invention comprises: a step of allowing a resource user terminal to request access authority of protected resource data to a resource owner terminal, in order to prevent a security threat; a verification step of allowing the resource owner terminal to verify the resource user terminal to request the setting of the access authority to an M2M server, and to transmit a verification key issued from the M2M server to the resource user terminal; an access authority setting step of allowing the M2M server to generate an access authentication key based on the verification key, and to transmit the access authentication key to the resource user terminal; and a using step of allowing the resource user terminal to inquire about the protected resource data from the M2M server based on the access authentication key, and to use the protected resource data.

19 Claims, 5 Drawing Sheets

METHOD FOR SHARING DATA OF DEVICE IN M2M COMMUNICATION AND SYSTEM THEREFOR

TECHNICAL FIELD

The present invention relates to a method and system for sharing data between devices in machine-to-machine (M2M) communication and, more particularly, to a method and system in which, in M2M communication, a device that owns resource data sets the access right of a device that attempts to use the resource data when the latter device attempts to access the resource data owned by the former device.

Furthermore, the present invention is based on the results of a project entitled "Development of M2M Terminal Standard Platform based on WiBro/LTE" (Project No.: 11913-04005), which was sponsored by the Korea Communications Commission (KCC).

BACKGROUND ART

In general, M2M communication is technology in which wireless communication modules are mounted on various devices (or things) and various communication services are enabled without the intervention of a person or with the minimum intervention of a person, and is technology that enables communication service between devices beyond conventional communication between humans. Such M2M technology surpasses a simple communication function between a person and a device or between devices, and the range of the M2M technology has expanded to a solution for combining communication and IT technology, collecting information about various devices, processing the information as available information, and providing required information in a customized way.

In this case, a device described in the present invention refers to an M2M terminal or an M2M gateway in the field of M2M communication, and a terminal or a gateway is used in the same sense in a short form.

In the M2M standard whose standardization is now being performed, information data managed by a terminal or a gateway device and a server is referred to as resource data. From the viewpoint of data information processing, an M2M service structure is configured such that data collected by a terminal and a gateway device is sent to an M2M server, and the network application of a service provider accesses the resource data of the M2M server and searches for information in accordance with the policies of the service provider without permission for access from a device, that is, the actual owner of the resource data. That is to say, a third party may access the data of a resource owner regardless of the intention of the resource owner because resource data is accessed based on predetermined and preset access rights. The standardization of M2M technology is now in its early stages, and the current M2M technology standard does not propose a specific method of setting the rights to access resource data. Efforts are being made to pursue a method of setting these rights to access data.

In the future, when one specific terminal requires information about the resource data of another terminal, a process of obtaining permission for the right to access another terminal that owns the resource data is required to obtain the information. A method of setting and assigning such data rights may become important technology in future M2M communication for the sharing of information between various terminal devices in the future.

DISCLOSURE

Technical Problem

In order to resolve the conventional problems, an object of the present invention is to provide a method of setting the right to access data so that a plurality of devices can share their resource data with one another in various M2M communication environments.

Technical Solution

In order to accomplish the above object, the present invention provides a method of, when the resource data of a device has been stored in a server, assigning the right to access the device in order for another device to use resource data owned by the device so that the resource data may be shared between the devices. As a result, the device to which the access right has been assigned may use the resource data of the device that owns the resource data stored in the server in such a way as to request a search for information about the resource data of the device. In this case, a security problem may occur in a transfer process if the device that attempts to use the resource data directly receives and uses the authentication key (having a role similar to that of a user name or a password) of the device that owns the resource data. Accordingly, the present invention proposes a method of issuing a temporary authentication key in order to temporarily set the right to access the resource data for a specific time without directly using the authentication key of the device that owns the resource data. Hereinafter, the term "terminal" should be construed as an example of a device, and those skilled in the art should understand that the terminal may be construed as being identical to the device in a comprehensive sense.

A method in which a resource user (or a resource client) terminal obtains the right to access the protected resource data of a resource owner terminal includes the following three methods. The first method is configured such that the resource owner terminal triggers a procedure in which the resource user terminal obtains the right to access the protected resource data in the state in which the resource owner terminal already knows the address of the resource user terminal that will use the resource data of the resource owner terminal and the address of the location where the protected resource data has been stored. The second method is configured such that the resource user terminal obtains the right to access in the state in which the resource user terminal already knows the address of a location of the resource owner terminal that owns the resource data and the location of the protected resource data (including the address of an M2M server). The third method is a method related to the type in which the relationship between the resource user terminal and the resource owner terminal is managed by the M2M server in the form of a service profile when the two terminals subscribe to M2M service in the state in which the two terminals do not know a counterpart's address. In this case, the service profile may designate a group of terminals that can share the resource data, and the service profile includes the type of resource data that can be provided by each terminal.

In an embodiment, the methods may include an access right request step of requesting, by a resource user terminal, the right to access protected resource data to be shared from a resource owner terminal based on information about the protected resource data; a verification step of verifying, by the resource owner terminal, the resource user terminal, requesting, by the resource owner terminal, an M2M server to set the access right of the resource user terminal, and sending, by the resource owner terminal, an verification key (an access right ID) issued by the M2M server to the resource user terminal; an access right setting step of generating, by the M2M server, an access authentication key based on the verification key transmitted by the resource user terminal, and sending, by the M2M server, the access authentication key to the resource user terminal; and a usage step of requesting, by the resource user terminal, a search for the protected resource data through the M2M server based on the access authentication key, and using, by the resource user terminal, the protected resource data.

In an embodiment, the access right request step may include the steps of: requesting, by the resource user terminal, a temporary authentication key for requesting the right to access the protected resource data by sending a first terminal application key to the M2M server; generating, by the M2M server, the temporary authentication key based on the first terminal application key, and issuing, by the M2M server, the temporary authentication key to the resource user terminal; and requesting, by the resource user terminal, permission for the right to access the protected resource data by sending the temporary authentication key and an ID of the resource owner terminal to the resource owner terminal.

In another embodiment, the access right request step may further include the step of notifying, by the resource owner terminal, the resource user terminal of the information about the protected resource data.

In addition to the above, the access right request step may further include the step of requesting, by the resource user terminal, the information about the protected resource data from the resource owner terminal.

In yet another embodiment, the access right request step may further include the steps of: requesting, by the resource user terminal, the M2M server to make a search for a service profile; searching for, by the M2M server, the service profile, and sending, by the M2M server, the service profile to the resource user terminal; and extracting, by the resource user terminal, the information about the protected resource data based on the service profile.

In an embodiment, the verification step comprises the steps of: requesting, by the resource owner terminal, the M2M server to make a search for the service profile; searching for, by the M2M server, the service profile, and sending, by the M2M server, the service profile to the resource owner terminal; and checking, by the resource owner terminal, whether or not the resource user terminal is included in the service profile.

In addition to the above, the service profile may include the relationships between terminals that have subscribed to corresponding service and a type of resource data owned by each terminal.

In an embodiment, the verification step may include the steps of: verifying, by the resource owner terminal, whether or not a terminal that has requested the right to access is the resource user terminal, and requesting, by the resource owner terminal, the M2M server to set the access right of the resource user terminal by sending a second terminal application key to the M2M server; identifying, by the M2M server, the resource owner terminal based on the second terminal application key, setting, by the M2M server, the right to access in response to the request for setting the right to access so that the resource user terminal can access the protected resource data, generating, by the M2M server, the verification key, and sending, by the M2M server, the verification key to the resource owner terminal; and sending, by the resource owner terminal, the verification key and a temporary authentication key to the resource user terminal.

In an embodiment, the access right setting step may include the steps of: requesting, by the resource user terminal, the access authentication key from the M2M server by sending the verification key to the M2M server; and generating, by the M2M server, the access authentication key from a second terminal application key of the resource owner terminal, and issuing, by the M2M server, the access authentication key to the resource user terminal.

In addition to the above, the access authentication key may include a use restriction period.

In an embodiment, the usage step may include requesting, by the resource user terminal, a search for the protected resource data by sending the information about the protected resource data and the access authentication key to the M2M server.

Furthermore, in order to implement the aforementioned method, the present invention proposes a system including a resource user terminal, an M2M server, a resource owner terminal, and a gateway. In this case, the resource user terminal and the resource owner terminal refer to terminal devices in M2M communication, the M2M server refers to a server providing M2M service, and the gateway refers to a device having an M2M gateway function in M2M communication. Furthermore, a terminal application key refers to a key generated using an M2M application identifier as one of input values in M2M communication and the M2M standard of European Telecommunications Standards Institute (ETSI).

Furthermore, the method of sharing data between devices in M2M communication is applied to all the relationships of the terminal-server-terminal, the gateway-server-gateway and the terminal-server-gateway.

A system for sharing data between devices in M2M communication according to another aspect of the present invention includes a resource owner terminal configured to generate protected resource data; a resource user terminal configured to request a the right to access the protected resource data to be shared from the resource owner terminal based on information about the protected resource data; and an M2M server configured to store the protected resource data, to generate a verification key (an access right ID) in response to a request from the resource owner terminal, to send the verification key to the resource user terminal, to generate an access authentication key in response to a request from the resource user terminal based on the verification key, to send the access authentication key to the resource user terminal, and to send the protected resource data to the resource user terminal when the resource user terminal requests a search for the protected resource data based on the access authentication key.

In an embodiment, the resource owner terminal may include a resource data generation unit configured to generate the protected resource data.

The present invention may further include a gateway disposed between at least one of the resource user terminal and the resource owner terminal and the M2M server and configured to relay the request and transmission. Furthermore, the gateway may replace the role of the resource owner terminal and the resource user terminal may have a relationship with gateways or a data sharing relationship between the terminal and the gateway.

In an embodiment, the M2M server may include a service management unit configured to manage registration of the resource user terminal and the resource owner terminal, to set the access right for sharing of the protected resource data, and to manage the sharing of the protected resource data; a key management unit configured to manage keys generated in response to requests from the resource user terminal and the resource owner terminal; and a key generation unit configured to generate a temporary authentication key for requesting the right to access the protected resource data, the verification key based on verification of the resource owner terminal, and the access authentication key based on the verification key.

In another embodiment, the M2M server may further include a database configured to store the protected resource data and terminal information including information about the registration of the resource user terminal and the resource owner terminal.

In addition to the above, the database further may store a service profile including relationships between terminals that have subscribed to corresponding service and a type of resource data owned by each terminal.

In an embodiment, an ETSI M2M standard may be applied to the resource user terminal, the resource owner terminal, an M2M gateway, and the M2M server.

In addition to the above, the protected resource data may include temperature, humidity and GPS location information.

Advantageous Effects

In the method and system for sharing data between devices in M2M communication according to the present invention, a terminal that uses resource data does not directly receive and use an application key having the same role as a user name and password for verifying a terminal that owns the resource data, that is, an authentication key for accessing the resource data of the terminal that owns the resource data. However, the terminal that attempts to use the resource data is identified by the resource owner terminal, the M2M server assigns an authentication key for temporary access to the terminal that attempts to use the resource data, and the terminal that attempts to use the resource data uses the authentication key for temporary access. Accordingly, the method and the system are advantageous in that information can be shared between a plurality of devices and a security threat that may occur in the sharing of resource data between terminals can also be prevented because a terminal having no rights is prevented from accessing the information of a corresponding terminal without the permission of an information owner.

MODE FOR INVENTION

Hereinafter, the present invention is described in detail with reference to preferred embodiments and the accompanying drawings so that those skilled in the art to which the present invention pertains may easily practice the present invention. However, the present invention may be implemented in various different forms, and is not limited to the illustrated embodiments.

First, a system for sharing data between devices in M2M communication according to an embodiment of the present invention is described with reference to FIGS. 1 to 4.

Figure 1:
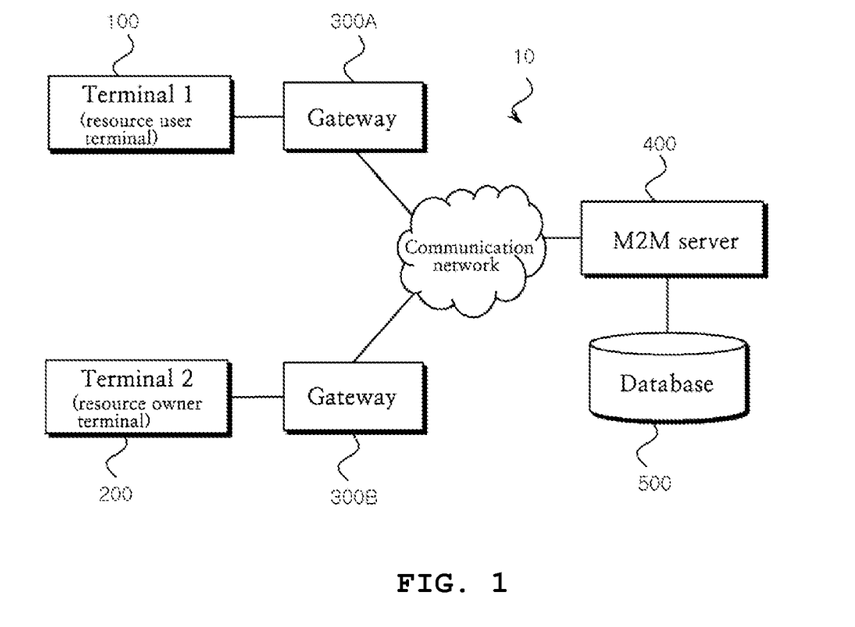
FIG. 1 is a diagram schematically illustrating a system for sharing data between devices in M2M communication according to an embodiment of the present invention.

FIG. 1 is a diagram schematically illustrating the system for sharing data between devices in M2M communication according to an embodiment of the present invention.

The system 10 for sharing data between devices in M2M communication includes M2M terminals 100 and 200, M2M gateways, and an M2M server 400 which have been implemented by applying the ETSI M2M standard. In this case, the M2M terminals 100 and 200, the M2M server 400, and protected resource data have respective identifiers (IDs) by which the M2M terminals 100 and 200, the M2M server 400, and the protected resource data may be identified. The M2M terminals 100 and 200 are registered with the M2M server 400.

In FIG. 1, the M2M terminal 100 or 200 may be a resource user terminal 100 or a resource owner terminal 200, and may include a terminal application that is implemented by applying the ETSI M2M standard, which is an M2M communication standard. Furthermore, the present invention is not only related to the relationship between an M2M terminal and an M2M terminal, but also includes the relationship between an M2M gateway and an M2M gateway and the relationship between an M2M terminal and an M2M gateway relationship, as described above. In the present specification, however, a description is given using the term "terminal" by way of example.

The terminal 1 100 may be a resource user terminal, and the terminal 2 200 may be a resource owner terminal. The terminal 1 100 and the terminal 2 200 may be equal in their location relationship, and may also have a reversed relationship. The resource user terminal 100 may be one of all terminal devices in M2M communication, is an object that attempts to use the protected resource data of the resource owner terminal 200, and requests the right to access the protected resource data from the resource owner terminal 200 based on information about the protected resource data to be used. The resource owner terminal 200 may be one of all terminal devices in M2M communication, and is an object that owns resource data. In this case, the resource user terminal 100 and the resource owner terminal 200 do not refer only to user terminals. The resource user terminal 100 may be a device capable of sharing and using resources provided by another device, and the resource owner terminal 200 may be a device capable of providing resources. For example, a gateway 300 may be used as the resource user terminal 100 or the resource owner terminal 200.

The gateway 300 is an M2M gateway, and may be a device implemented by applying the ETSI M2M standard or a device including a gateway application. The gateway 300 may be disposed between at least one of the resource user terminal 100 and the resource owner terminal 200 and the M2M server 400. The gateway 300 is responsible for a function of relaying messages between the M2M terminal 100 or 200 and the M2M server 400. For example, although in FIG. 1, gateways 300 have been illustrated as being disposed between the resource user terminal 100 and the M2M server 400 and between the resource owner terminal 200 and the M2M server 400, the gateway 300 may be disposed only between the resource user terminal 100 and the M2M server 400 or between the resource owner terminal 200 and the M2M server 400. In this case, although the gateway 300 has been illustrated as being disposed between the resource user terminal 100 or resource owner terminal 200 and the M2M server 400 and relaying messages, it will be apparent that the gateway 300 may be a resource owning device that provides resources or a resource use device that shares and uses the resources of another device and the gateway may be excluded.

The M2M server 400 includes a device implemented by applying the ETSI M2M standard. This M2M server 400 is an object that securely stores the protected resource data of the resource owner terminal 200 via a database 500. The M2M server 400 is an object that relays messages between the resource user terminal 100 and the resource owner terminal 200 and that issues and manages an authentication key related to the sharing of data. This M2M server 400 generates a verification key in response to a request from the resource owner terminal 200, sends the verification key to the resource user terminal 100, generates an access authentication key in response to a request from the resource user terminal 100 based on the transmitted verification key, sends the access authentication key to the resource user terminal 100, and sends protected resource data to the resource user terminal 100 when the resource user terminal 100 requests a search for the protected resource data based on the generated access authentication key.

The database 500 stores resource data generated by the resource owner terminal 200. In this case, the resource data includes data that is owned by a resource owner, for example, data that may be generated by an M2M terminal, such as temperature, humidity and GPS location information. The resource data is protected so that a terminal not allowed to access the resource data is unable to access the resource data.

In FIG. 1, communication for the exchange of messages between the resource user terminal 100 and the resource owner terminal 200, and the M2M server 400 or gateway 300 may be performed using a wired/wireless communication network, and is not limited to a specific communication method.

Figure 2:
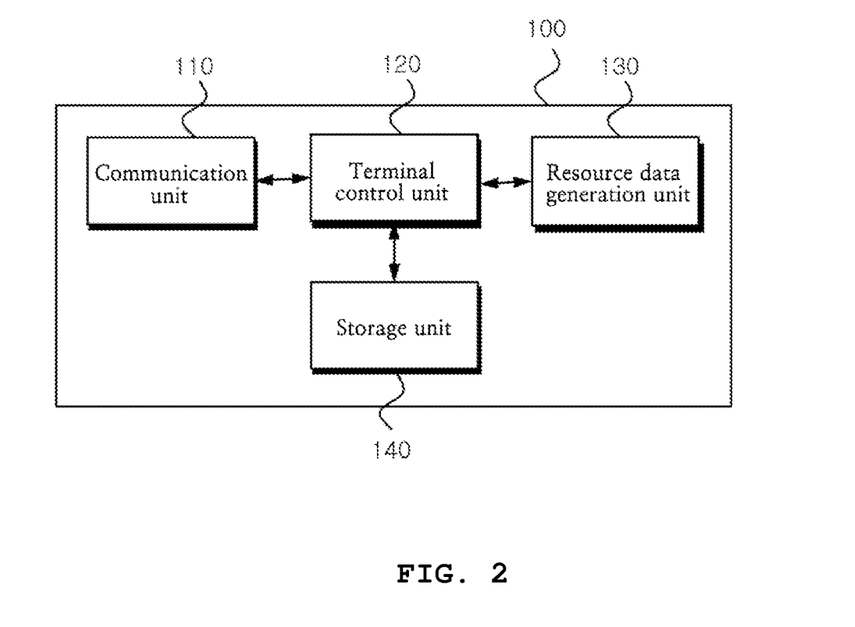
FIG. 2 is a block diagram of the user terminal of the system for sharing data between devices in M2M communication according to an embodiment of the present invention.

FIG. 2 is a block diagram of the user terminal of the system for sharing data between devices in M2M communication according to an embodiment of the present invention.

As described above, the resource user terminal 100 and the resource owner terminal 200 have the same construction, and the roles thereof may change depending on the setting of the access right for the sharing of data.

As illustrated in FIG. 2, the M2M terminal 100 includes a communication unit 110 configured to communicate with the gateway 300 or the M2M server 400 for the exchange of messages; a terminal control unit 120 configured to control a request for, or the verification of the access right for the sharing of data; a resource generation unit 130 configured to generate resources; and a storage unit 140 configured to store data.

The communication unit 110 is implemented using a communication method capable of communication with the gateway 300 or the M2M server 400 over a wired/wireless public communication network, and is not limited to a specific communication method.

If the M2M terminal 100 functions as a resource user terminal, the terminal control unit 120 controls a series of procedures for requesting and obtaining the right to access in order to share the resource data of the resource owner terminal. If the M2M terminal 100 functions as a resource owner terminal, the terminal control unit 120 controls a series of procedures for storing generated resource data by registering the generated resource data with the M2M server 400 and verifying the right to access requested by a resource user terminal.

The resource generation unit 130 generates protected resource data if the M2M terminal 100 functions as a resource owner terminal. For example, the resource generation unit 130 generates temperature, humidity and GPS location information.

The storage unit 140 stores a terminal application key and an application ID that are registered with and issued by the M2M server 400, and stores information about the location of the user terminal and the location of protected resource data.

Figure 3:
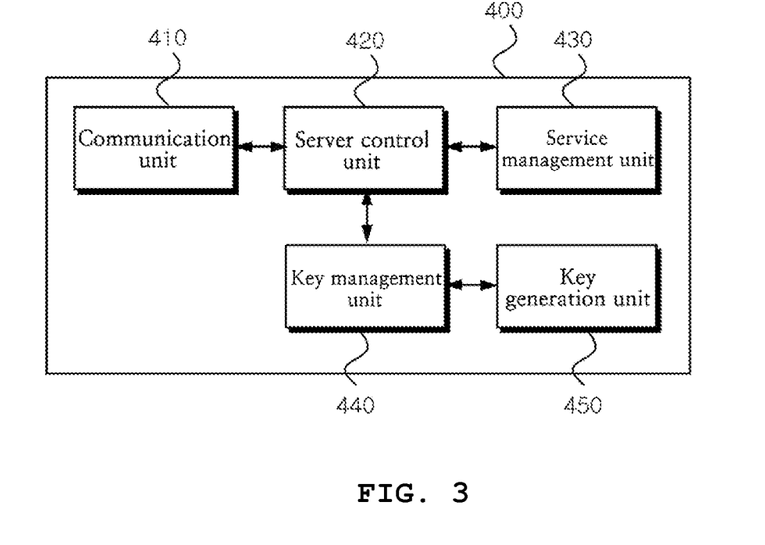
FIG. 3 is a block diagram of the M2M server of the system for sharing data between devices in M2M communication according to an embodiment of the present invention.

FIG. 3 is a block diagram of the M2M server of the system for sharing data between devices in M2M communication according to an embodiment of the present invention.

The M2M server 400 includes a communication unit 410 configured to communicate with the M2M terminals 100 and 200, a server control unit 420 configured to control the sharing of data between the M2M terminals 100 and 200, a service management unit 430 configured to manage service profiles, a key management unit 440 configured to manage keys related to the rights of access, and a key generation unit 450 configured to generate the keys related to the rights of access.

The communication unit 410 is implemented using a communication method capable of communication with the resource user terminal 100, the resource owner terminal 200 or the gateway 300 over a wired/wireless public communication network, and is not limited to a specific communication method.

The service management unit 430 manages the registration of the resource user terminal 100 and the resource owner terminal 200, manages service profiles including the relationship between terminals, sets the rights of access for the sharing of protected resource data, and manages the sharing of the protected resource data.

The key management unit 440 assigns an application key to each terminal when the resource user terminal 100 and the resource owner terminal 200 are registered with the M2M server 400, and manages a key generated in response to a request from each terminal.

The key generation unit 450 generates a terminal application key when the resource user terminal 100 and the resource owner terminal 200 are registered with the M2M server 400, and generates a temporary authentication key for requesting the right to access protected resource data, a verification key based on the verification of the resource owner terminal 200, or an access authentication key based on the verification key.

Figure 4:
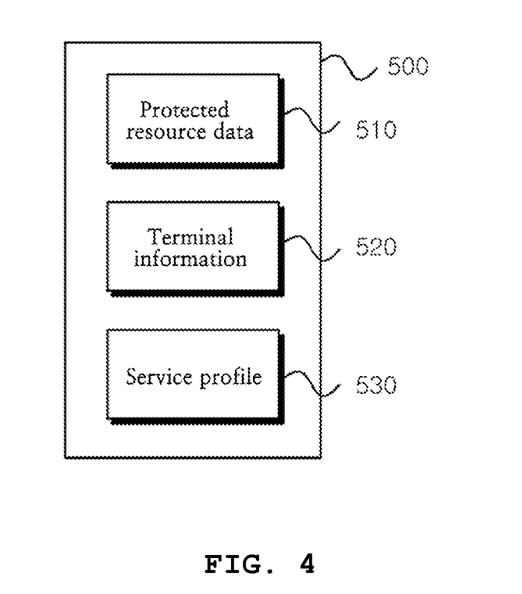
FIG. 4 is a block diagram of the database of the system for sharing data between devices in M2M communication according to an embodiment of the present invention.

FIG. 4 is a block diagram of the database of the system for sharing data between devices in M2M communication according to an embodiment of the present invention.

The database 500 includes protected resources 510, terminal information 520, and service profiles 530. The protected resources 510 include protected resource data generated by the resource owner terminal 200 and registered with the M2M server 400, and the protected resource information may include temperature, humidity and GPS location information. The terminal information 520 includes registration information including information about the locations of the resource user terminal 100 and the resource owner terminal 200. The service profiles 530 include the relationships between terminals that have subscribed to corresponding service and the type of resource data owned by each terminal.

Hereinafter, methods of sharing data between devices in M2M communication according to the present invention are described with reference to FIGS. 5 to 7.

Figure 5:
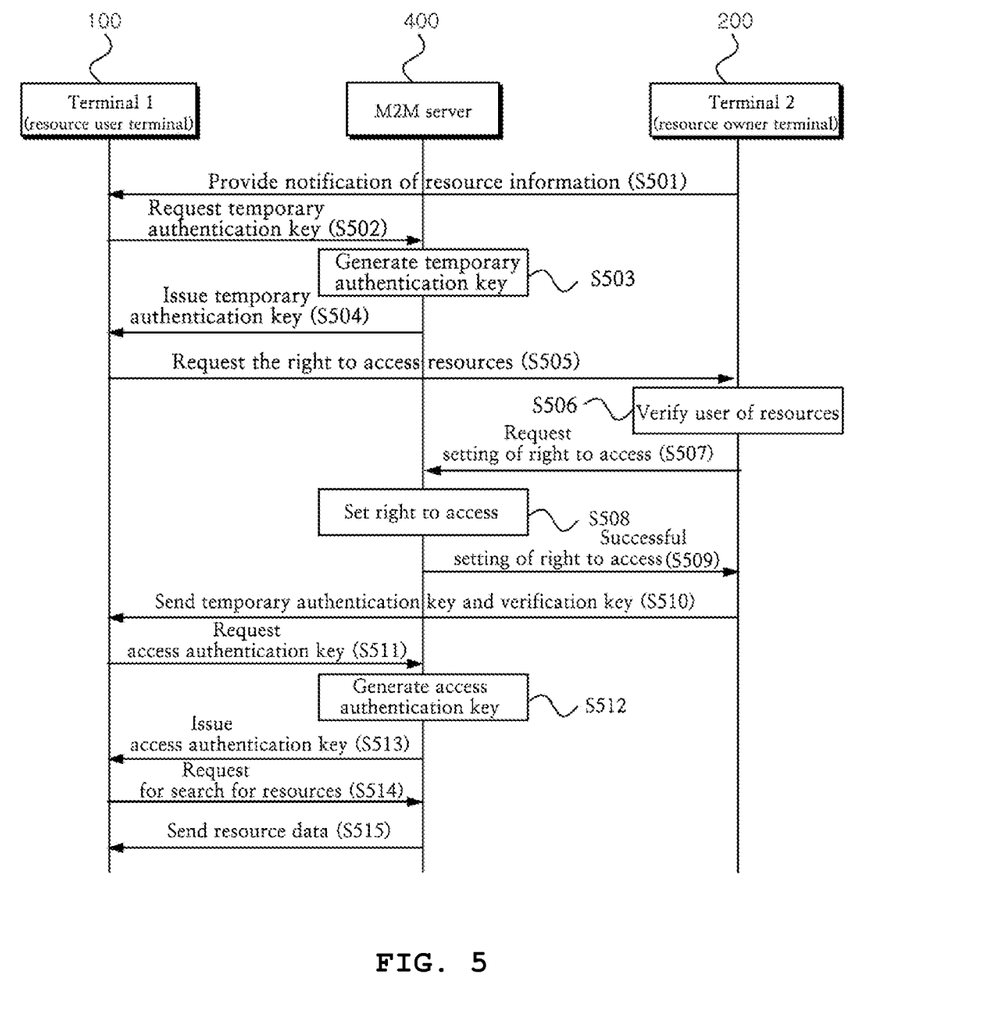
FIG. 5 is a flowchart illustrating a method of sharing data between devices in M2M communication according to an embodiment of the present invention.

FIG. 5 is a flowchart illustrating a method of sharing data between devices in M2M communication according to an embodiment of the present invention.

In FIG. 5, the resource owner terminal 200 already knows the address of the resource user terminal 100 with which protected resource data is to be shared, and first provides notification to the resource user terminal 100 in order to set the right to access the protected resource data. In this case, the service registration of the resource user terminal 100 and the resource owner terminal 200 with the M2M server 400 has been completed. Furthermore, the M2M server 400 generates an application key and an application ID for each terminal, assigns the application key and the application ID to each terminal, and manages the application key and the application ID. In this case, the resource owner terminal 200 generates resource data, and stores the resource data in the database 500 via the M2M server 400.

At step S501, the resource owner terminal 200 notifies the resource user terminal 100 of information about the protected resource data. In this case, the information about the protected resource data may include information about a location where the protected resource data has been stored and information about the owner of the protected resource data. That is, the resource owner terminal 200 sends the information about a location where the protected resource data including its own ID and the address of the M2M server 400 has been stored to the resource user terminal 100 via the M2M server 400.

Thereafter, the resource user terminal 100 requests the right to access the protected resource data from the resource owner terminal 200 based on the information about the protected resource data to be shared. At step S502, the resource user terminal 100 requests the issuance of a temporary authentication key from the M2M server 400 in which the protected resource data received from the resource user terminal 100 is stored. In this case, the resource user terminal 100 requests the M2M server 400 to issue the temporary authentication key for requesting the right to access the resource owner terminal 200 by sending its own terminal application key to the M2M server 400. At step S503, the M2M server 400 generates the temporary authentication key based on the application key of the resource user terminal 100. At step S504, the M2M server 400 issues the generated temporary authentication key to the resource user terminal 100. At step S505, the resource user terminal 100 requests the right to access the protected resource data by sending the issued temporary authentication key and the ID of the resource owner terminal 200 to the resource owner terminal 200 via the M2M server 400.

Thereafter, the resource owner terminal 200 verifies the resource user terminal 100, requests the M2M server 400 to set the access right of the resource user terminal 100, and sends a verification key issued by the M2M server 400 to the resource user terminal 100. At step S506, the resource owner terminal 200 verifies whether or not a terminal that has requested the right to access the protected resource data is the resource user terminal 100. At step S507, the resource owner terminal 200 requests the M2M server 400 to permit and set the access right of the resource user terminal 100 so that the resource user terminal 100 may access its own protected resource data. In this case, the resource owner terminal 200 sends its own terminal application key to the M2M server 400, and may designate an expiration time (expireTime). At step S508, the M2M server 400 identifies the resource owner terminal 200 based on the received application key, and sets the right to access in response to a request for the setting of access permission so that the resource user terminal 100 may access the protected resource data. The setting of the right to access in M2M communication is a process of generating resource data of an access right (AR) to refer to the protected resource data. In this case, a connection relationship between the right to access and the resource user terminal 100 is established. In this case, the M2M server 400 generates the verification key (access right ID) as a result of setting of the right to access. At step S509, when a task of setting the right to access is successfully completed, the M2M server 400 sends the verification key to the resource owner terminal 200 as the AR ID of the right to access. At step S510, the resource owner terminal 200 sends the verification key, confirming that the resource user terminal 100 has been verified, to the resource user terminal 100 via the M2M server 400. In this case, the temporary authentication key is also transmitted.

Thereafter, the M2M server 400 generates an access authentication key based on the verification key transmitted by the resource user terminal 100, and sends the access authentication key to the resource user terminal 100. At step S511, the resource user terminal 100 requests the access authentication key from the M2M server 400 by sending the verification key, received from the resource owner terminal 200, to the M2M server 400 along with its own application key and the temporary authentication key issued by the M2M server 400. In this case, the access authentication key is a final authentication key capable of accessing the protected resource data of the resource owner terminal 200. At step S512, the M2M server 400 checks whether or not the resource user terminal 100 is a legitimate resource user terminal 100 for which the right to access have been set by the resource owner terminal 200 based on the temporary authentication key, the verification key, and the application key transmitted by the resource user terminal 100. If the resource user terminal 100 is a legitimate user, the M2M server 400 generates the access authentication key from the application key of the resource owner terminal 200. In this case, the M2M server 400 connects the generated access authentication key with the protected resource data to be shared. In this case, the access authentication key may include a use restriction period. For example, if an M2M terminal that attempts to access the protected resource data using an access authentication key whose use restriction period has expired is present, the access to the protected resource data is denied based on the access authentication key whose use restriction period has expired. In order to access the protected resource data, the resource user terminal 100 that owns an expired access authentication key needs to have an access authentication key issued again. At step S513, the M2M server 400 transfers and issues the generated access authentication key to the resource user terminal 100 that has requested the access authentication key.

Thereafter, the resource user terminal 100 requests a search for the protected resource data of the resource owner terminal 200 to be shared via the M2M server 400 based on the access authentication key issued by the M2M server 400. At step S514, the resource user terminal 100 requests a search for the protected resource data via the M2M server 400 by sending information about the protected resource data and the access authentication key to the M2M server 400. In this case, the information about the protected resource data may be information about the location where the protected resource data including the address (URI) of the server 400 has been stored. At step S515, the M2M server 400 checks whether or not the request for the search for the resource data has been made by the resource user terminal 100 having the right to access based on the received access authentication key, searches for the protected resource data connected to the access authentication key, and sends the retrieved protected resource data to the resource user terminal 100. The resource user terminal 100 may share the protected resource data through such a process.

Figure 6:
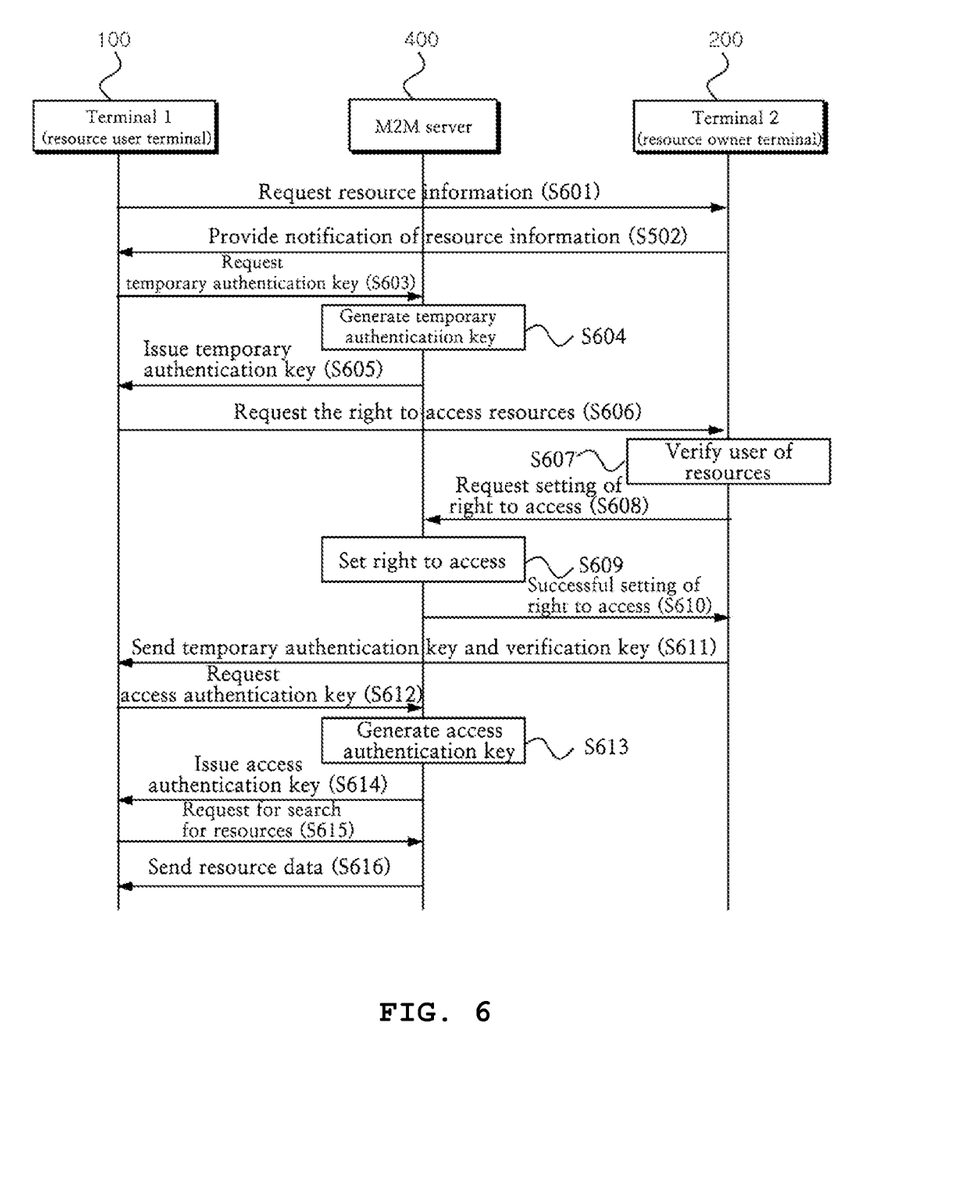
FIG. 6 is a flowchart illustrating a method of sharing data between devices in M2M communication according to another embodiment of the present invention.

FIG. 6 is a flowchart illustrating a method of sharing data between devices in M2M communication according to another embodiment of the present invention.

In FIG. 6, the resource user terminal 100 that attempts to share protected resource data already knows the address of a resource owner terminal 200 of the protected resource data, and first requests the right to access the protected resource data from the resource owner terminal 200. In this case, the service registration of the resource user terminal 100 and the resource owner terminal 200 with the M2M server 400 has been completed. Furthermore, the M2M server 400 generates an application key and an application ID for each terminal, assigns the application key and the application ID to each terminal, and manages the application key and the application ID. In this case, the resource owner terminal 200 generates the resource data, and stores the generated resource data in the database 500 via the M2M server 400.

At step S601, the resource user terminal 100 requests information about the protected resource data from the resource owner terminal 200 in order to be aware of information about the location of the protected resource data. At step S602, the resource owner terminal 200 notifies the resource user terminal 100 of the information about the protected resource data. In this case, the information about the protected resource data may include information about a location where the protected resource data has been stored and information about the owner of the protected resource data. That is, the resource owner terminal 200 sends information about the location where the protected resource data including its own ID and the address of the M2M server 400 has been stored to the resource user terminal 100 via the M2M server 400.

Thereafter, the right to access the protected resource data for the resource user terminal 100 may be approved by the resource owner terminal 200, and the resource user terminal 100 may share the corresponding resource data through step S603 to step S616, which correspond to step S502 to step S515, such as those described above in conjunction with FIG. 5. In this case, descriptions of step S603 to step S616 are omitted. The resource user terminal 100 may share the protected resource data through such a process.

Figure 7:
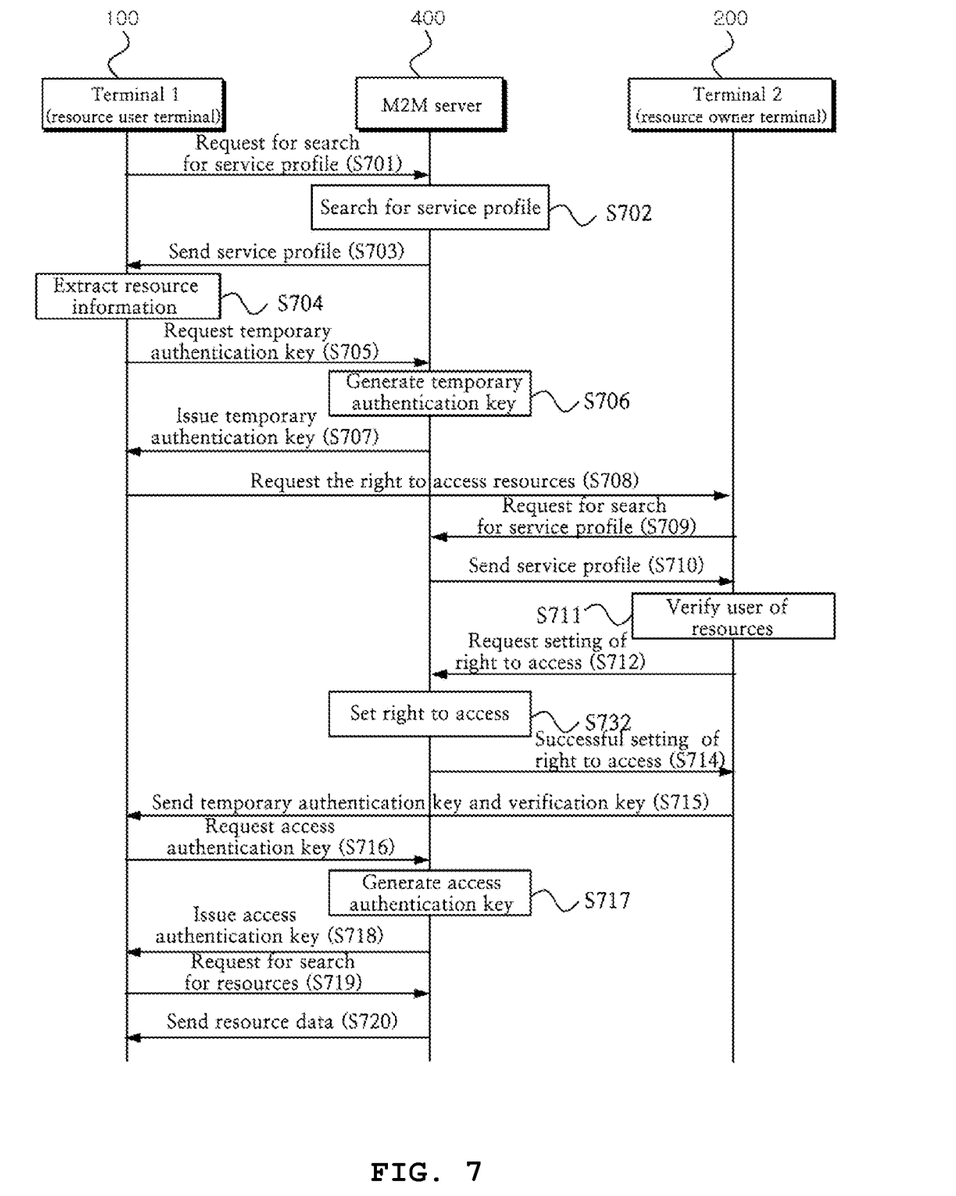
FIG. 7 is a flowchart illustrating a method of sharing data between devices in M2M communication according to yet another embodiment of the present invention.

FIG. 7 is a flowchart illustrating a method of sharing data between devices in M2M communication according to yet another embodiment of the present invention.

In FIG. 7, the resource user terminal 100 and the resource owner terminal 200 do not know a counterpart's address, and the resource user terminal 100 first requests the right to access protected resource data from the resource owner terminal 200. In this case, the service registration of the resource user terminal 100 and the resource owner terminal 200 with the M2M server 400 has been completed. In this case, the resource owner terminal 200 generates the resource data, and stores the generate resource data in the database 500 via the M2M server 400. The M2M server 400 generates an application key and an application ID for each terminal, assigns the application key and the application ID to each terminal, and manages the application key and the application ID. Furthermore, the M2M server 400 generates a connection relationship and service profiles between the resource user terminal 100 and the resource owner terminal 200 when the two terminals register M2M service. In this case, service profiles may include the relationships between terminals that have subscribed to corresponding service and the type of resource data owned by each terminal. Through such a service profile, each terminal may extract the address of a counterpart terminal or the type of data in order to request a search for information about resource data required for the terminal or set the right to access.

At step S701, the resource user terminal 100 requests the M2M server 400 to search for a service profile related to the resource user terminal 100 in order to be aware of the address of the resource owner terminal 200 and the location where the protected resource data has been stored. At step S702, the M2M server 400 searches for the service profile that is related to the resource user terminal 100 and that is suitable for the type of requested data. At step S703, the M2M server 400 sends the retrieved service profile to the resource user terminal 100. At step S704, the resource user terminal 100 extracts information about the protected resource data based on the service profile received from the M2M server 400. In this case, the information about the protected resource data may include information about an owner, including the address of the resource owner terminal 200, and the location where the protected resource data has been stored.

Thereafter, the resource user terminal 100 may request the right to access the protected resource data from the resource owner terminal 200 through step S705 to step S708, which correspond to step S502 to step S505, such as those described above with reference to FIG. 5. In this case, a description of step S705 to step S708 is omitted.

At step S709, the resource owner terminal 200 requests the M2M server 400 to search for the service profile in order to check whether or not the resource user terminal 100 that has requested the right to access the protected resource data is a legitimate terminal to which the right to access can be assigned. At step S710, the M2M server 400 searches for information about the service profile in response to the request from the resource user terminal 100, and sends the corresponding service profile to the resource owner terminal 200. At step S711, the resource owner terminal 200 verifies the resource user terminal 100 by checking whether or not the resource user terminal 100 is included in the service profile received from the M2M server 400.

Thereafter, through steps S712 to S720, the resource owner terminal 200 may set the access right of the resource user terminal 100 and the resource user terminal 100 may share the corresponding resource data, which correspond to step S507 to step S515, such as those described above in conjunction with FIG. 5. In this case, descriptions of S712 to step S720 are omitted. The resource user terminal 100 may share the protected resource data through this process.

While the preferred embodiments of the present invention have been described above, the present invention is not limited to the embodiments. The present invention may be modified and embodied in various manners within the scope of the technical spirit of the present invention, and it is apparent that these modifications also belong to the attached claims.

(Description of Reference Numerals)

10: system for sharing data between devices in M2M communication
100: resource user terminal  110: communication unit
120: terminal control unit
130: resource data generation unit
140: storage unit
200: resource owner terminal
300: gateway  400: M2M server
410: communication unit  420: server control unit
430: service management unit  440: key management unit
450: key generation unit  500: database
510: protected resource data  520: terminal information
530: service profiles

What is claimed is:

1. A method of sharing data between devices in Machine-to-Machine (M2M) communication, the method comprising:
an access right request step of requesting, by a resource user terminal, a right to access protected resource data to be shared from a resource owner terminal based on information about the protected resource data;
a verification step of verifying, by the resource owner terminal, the resource user terminal, requesting, by the resource owner terminal, an M2M server to set the access right of the resource user terminal, and sending, by the resource owner terminal, an verification key (an access right ID) issued by the M2M server to the resource user terminal;
an access right setting step of generating, by the M2M server, an access authentication key based on the verification key transmitted by the resource user terminal, and sending, by the M2M server, the access authentication key to the resource user terminal; and
a usage step of requesting, by the resource user terminal, a search for the protected resource data through the M2M server based on the access authentication key, and using, by the resource user terminal, the protected resource data.

2. The method of claim 1, wherein the access right request step comprises the steps of:
requesting, by the resource user terminal, a temporary authentication key for requesting the right to access the protected resource data by sending a first terminal application key to the M2M server;
generating, by the M2M server, the temporary authentication key based on the first terminal application key, and issuing, by the M2M server, the temporary authentication key to the resource user terminal; and
requesting, by the resource user terminal, permission for the right to access the protected resource data by sending the temporary authentication key and an ID of the resource owner terminal to the resource owner terminal.

3. The method of claim 2, wherein the access right request step further comprises the step of notifying, by the resource owner terminal, the resource user terminal of the information about the protected resource data.

4. The method of claim 3, wherein the access right request step further comprises the step of requesting, by the resource user terminal, the information about the protected resource data from the resource owner terminal.

5. The method of claim 2, wherein the access right request step further comprises the steps of:
requesting, by the resource user terminal, the M2M server to make a search for a service profile;
searching for, by the M2M server, the service profile, and sending, by the M2M server, the service profile to the resource user terminal; and
extracting, by the resource user terminal, the information about the protected resource data based on the service profile.

6. The method of claim 5, wherein the verification step comprises the steps of:
requesting, by the resource owner terminal, the M2M server to make a search for the service profile;
searching for, by the M2M server, the service profile, and sending, by the M2M server, the service profile to the resource owner terminal; and
checking, by the resource owner terminal, whether or not the resource user terminal is included in the service profile.

7. The method of claim 5, wherein the service profile comprises relationships between terminals that have subscribed to corresponding service and a type of resource data owned by each terminal.

8. The method of claim 1, wherein the verification step comprises the steps of:
verifying, by the resource owner terminal, whether or not a terminal that has requested the right to access is the resource user terminal, and requesting, by the resource owner terminal, the M2M server to set the access right of the resource user terminal by sending a second terminal application key to the M2M server;
identifying, by the M2M server, the resource owner terminal based on the second terminal application key, setting, by the M2M server, the right to access in response to the request for setting the right to access so that the resource user terminal can access the protected resource data, generating, by the M2M server, the verification key, and sending, by the M2M server, the verification key to the resource owner terminal; and
sending, by the resource owner terminal, the verification key and a temporary authentication key to the resource user terminal.

9. The method of claim 1, wherein the access right setting step comprises the steps of:
requesting, by the resource user terminal, the access authentication key from the M2M server by sending the verification key to the M2M server; and
generating, by the M2M server, the access authentication key from a second terminal application key of the resource owner terminal, and issuing, by the M2M server, the access authentication key to the resource user terminal.

10. The method of claim 9, wherein the access authentication key comprises a use restriction period.

11. The method of claim 1, wherein the usage step comprises requesting, by the resource user terminal, a search for the protected resource data by sending the information about the protected resource data and the access authentication key to the M2M server.

12. The method of claim 1, wherein the method of sharing data between devices in M2M communication is also applied to a gateway-server-gateway relationship or a terminal-server-gateway relationship.

13. A system for sharing data between devices in Machine-to-Machine (M2M) communication, the system comprising:
a resource owner terminal configured to generate protected resource data;
a resource user terminal configured to request a right to access the protected resource data to be shared from the resource owner terminal based on information about the protected resource data; and
an M2M server configured to store the protected resource data, to generate a verification key (an access right ID) in response to a request from the resource owner terminal, to send the verification key to the resource user terminal, to generate an access authentication key in response to a request from the resource user terminal based on the verification key, to send the access authentication key to the resource user terminal, and to send the protected resource data to the resource user terminal when the resource user terminal requests a search for the protected resource data based on the access authentication key.

14. The system of claim 13, wherein the resource owner terminal comprises a resource data generation unit configured to generate the protected resource data.

15. The system of claim 13, further comprising a gateway disposed between at least one of the resource user terminal and the resource owner terminal and the M2M server and configured to relay the request and transmission.

16. The system of claim 13, wherein the M2M server comprises:
- a service management unit configured to manage registration of the resource user terminal and the resource owner terminal, to set the access right for sharing of the protected resource data, and to manage the sharing of the protected resource data;
- a key management unit configured to manage keys generated in response to requests from the resource user terminal and the resource owner terminal; and
- a key generation unit configured to generate a temporary authentication key for requesting the right to access the protected resource data, the verification key based on verification of the resource owner terminal, and the access authentication key based on the verification key.

17. The system of claim 16, wherein the M2M server further comprises a database configured to store the protected resource data and terminal information including information about the registration of the resource user terminal and the resource owner terminal.

18. The system of claim 17, wherein the database further stores a service profile including relationships between terminals that have subscribed to corresponding service and a type of resource data owned by each terminal.

19. The system of claim 13, wherein an European Telecommunication Standards Institute Machine-to-Machine (ETSI M2M) standard is applied to the resource user terminal, the resource owner terminal, an M2M gateway, and the M2M server.

* * * * *